United States Patent [19]

Thomas et al.

[11] Patent Number: 5,481,294

[45] Date of Patent: Jan. 2, 1996

[54] AUDIENCE MEASUREMENT SYSTEM UTILIZING ANCILLARY CODES AND PASSIVE SIGNATURES

[75] Inventors: William L. Thomas, Clearwater; Daozheng Lu, Dunedin, both of Fla.

[73] Assignee: A. C. Nielsen Company, Schaumburg, Ill.

[21] Appl. No.: 144,289

[22] Filed: Oct. 27, 1993

[51] Int. Cl.$^6$ ............................................. H04N 7/00
[52] U.S. Cl. ........................... 348/1; 348/907; 348/180; 455/2
[58] Field of Search ............................ 348/1, 4, 907, 348/180, 184, 185; 358/84; 455/2; H04N 7/10, 7/00

[56] References Cited

U.S. PATENT DOCUMENTS

| | | | |
|---|---|---|---|
| 4,025,851 | 5/1977 | Haselwood et al. | 325/31 |
| 4,644,509 | 2/1987 | Kiewit | 348/1 |
| 4,677,466 | 6/1987 | Lert, Jr. et al. | 358/84 |
| 4,697,209 | 9/1987 | Kiewit et al. | 358/84 |
| 4,718,106 | 1/1988 | Weinblatt | 455/2 |
| 4,739,398 | 4/1988 | Thomas | 348/1 |
| 4,807,031 | 2/1989 | Broughton et al. | 358/142 |
| 4,858,000 | 8/1989 | Lu | 358/84 |
| 4,888,638 | 12/1989 | Bohn | 358/84 |
| 4,945,412 | 7/1990 | Kramer | 358/142 |
| 5,019,899 | 5/1991 | Boles | 348/1 |
| 5,031,228 | 7/1991 | Lu | 382/38 |
| 5,223,924 | 6/1993 | Strubbe | 358/86 |

OTHER PUBLICATIONS

An Audio Engineering Society Paper.
An Aware Technical Report AD900119.

*Primary Examiner*—Victor R. Kostak
*Assistant Examiner*—Sherrie Hsia
*Attorney, Agent, or Firm*—Marshall, O'Toole, Gerstein, Murray & Borun

[57] ABSTRACT

An audience measurement system collects data representative of tuned programs rather than of tuned channels, and includes (i) a household metering apparatus which records ancillary codes or extracts program signatures from the programs if no ancillary codes are found therein, (ii) a reference apparatus which monitors broadcast programs to be monitored, which extracts reference signatures therefrom, which records whatever ancillary codes may be associated with these broadcast programs and, if no ancillary codes are present, which compresses and stores a digital replica representative of the broadcast programs to be monitored, (iii) a data collection apparatus which compares the household and reference data to determine (a) which of the broadcast programs to be monitored were selected for viewing and/or listening, (b) which of the metered households selected the broadcast programs to be monitored for viewing and/or listening, and (c) at which times the broadcast programs to be monitored were selected for viewing and/or listening.

37 Claims, 12 Drawing Sheets

| TIME | FLAG | TYPE | CODE | SIGNATURES |
|---|---|---|---|---|
| H:M:0 | T.V. ON | 01 | | |
| H:M:01 | | 05 | 1FA377 | |
| H:M+3:03 | | 05 | 4FA5BB | |
| H:M+3:05 | CHANNELCHANGE | 02 | | 2CA7DD187CE6 |
| H:M+3:08 | | 06 | | F094B1026C08 |
| H:M+3:24 | | 06 | | 00 |

FIGURE 4

| TIME | TYPE | CODE | SIGNATURE | REPLICA |
|---|---|---|---|---|
| H:M:Ø1 | Ø6 | 1FA377 | DEØ1Ø48A47EA | — |
| H:M:Ø9 | Ø5 | 1FA377 | DSA4ØØA7FF | — |
| ⋮ | ⋮ | ⋮ | ⋮ | ⋮ |
| H:M+2:44 | Ø4 | 1FA377 | 21A8E145B44E | — |
| H:M+3:Ø3 | Ø5 | 4FA5BB | 2CA7DD187CE6 | — |
| H:M+3:11 | Ø4 | 4FA5BB | E11Ø24A17CFØ | — |

154 / 156 / 158 / 160 / 162 / 164

| TIME | TYPE | CODE | SIGNATURE | REPLICA |
|---|---|---|---|---|
| H:M:Ø3 | Ø8 | — | 3CAF73ØCD4 | 1AB7DEAF16 |
| H:M:14 | Ø9 | — | 6ØDECAØ5A1 | CØBE77Ø3FA |
| ⋮ | ⋮ | ⋮ | ⋮ | ⋮ |
| H:M+2:54 | Ø8 | — | BA11Ø79ED4 | C2A79Ø8FF |
| H:M+3:Ø4 | Ø7 | — | 2CA7DD187CE6 | F3A41E76Ø9 |
| H:M+3:Ø8 | Ø8 | — | FØ94B1Ø26CØ8 | 15ØABCØØFD |
| H:M+3:24 | Ø9 | — | ØØ1ØA735D49F | D5EEØ3F723 |

AUDIENCE MEASUREMENT SYSTEM UTILIZING ANCILLARY CODES AND PASSIVE SIGNATURES

TECHNICAL FIELD OF THE INVENTION

The present invention relates to an audience measurement system and, more particularly, to an audience measurement system which identifies the programs or stations of televisions or radios which are watched, or listened to, by an audience.

BACKGROUND OF THE INVENTION

Although the present invention is described herein with particular reference to television audience monitoring, it should be realized that the present invention applies equally well to radio audience monitoring. Also, as used herein, the term "programs" means segments of various lengths such as all or parts of programs, commercials, promos, public service announcements, and the like.

Broadcast audience measurements have conventionally been made with equipment placed in statistically selected households to monitor the channels to which each receiver in the statistically selected households is tuned. Data from such statistically selected households are collected at a central office and compared with separately collected reference data. This reference data includes a compiled list of those programs which were available on each receivable channel during each time period of interest, and are commonly referred to as program records. (Reference data may alternatively be referred to as station records, cable records, or the like.) By comparing the tuned channels, i.e. the channels to which the receivers in the statistically selected household were tuned, to the programs available on those channels at the time, an inference can be made as to the identities of the programs selected by the members of the household.

Program records are becoming increasingly difficult to compile because the average number of channels which may be received by a sampled home has grown dramatically over the past decades. This growth is largely due to an increase in the number of sources creating and/or broadcasting programs and to an increase in the accessibility to these sources. This accessibility, in turn, is due in large part to a growth in the number of cable and satellite systems which distribute programs. The growth in the number of, and accessibility to, channels which can be received and selected has increased the difficulty and expense of compiling accurate program records. Thus, there is a need for a program-based, rather than a channel-based, system to measure the audience of programs so that the dependence of present systems on program records, which are difficult and expensive to compile, can be eliminated.

Additionally, conventional audience measurement equipment is expensive to install in a statistically selected household. A significant part of this expense is associated with the need to calibrate the tuned channels to the corresponding program sources (especially when the signals that come into the household are routed through a multitude of tuners, such as television tuners, cable converters, VCR tuners, and the like). Another significant part of this expense arises from the common need to open up (i.e., intrude into) monitored receivers and/or associated equipment so that the installer of the audience measurement equipment can secure access to the tuners of these receivers and/or associated equipment. Also, members of the statistically selected households may be reluctant to permit such intrusions for fear that the intrusions will cause damage or be unsightly.

Moreover, there is always at least some inherent confusion in the viewing records produced by an audience measurement system because, although the system accurately reports both the channels to which the receivers in a statistically selected household are tuned and the times during which those receivers are tuned to those channels, the programs currently being broadcast on those channels and at those times are not always accurately known. One suggested approach to avoiding this confusion is to label each broadcast program with an ancillary code (e.g., a digital code written on a selected video line in the vertical blanking interval of each video program to be broadcasted and/or monitored). This ancillary code can then be read by the metering equipment in the sampled households and can be compared (e.g., in a central office computer) to the ancillary codes stored in a code-program name library. The code-program name library contains a manually entered list of program names and the codes associated therewith. Thus, given an ancillary code of a program selected for viewing and/or listening in the sampled households, the program name of this program can be easily determined from the library. Although a system of this sort has been previously suggested, such a system has not been successfully employed for audience measurement because it requires all possible programs to be encoded before a complete measurement can be made, and because it requires an ancillary code that can pass through a variety of distribution and broadcasting processes without being stripped or corrupted and thereby rendered illegible.

Ancillary codes are more often used to verify program line-ups. That is, a typical audience measurement system determines both the channels to which the receivers in the statistically selected households are tuned and the times that the receivers are tuned to those channels. The tuned channels, and the times during which those channels are tuned, are periodically transmitted to a central facility where the tuned channels, and the times during which those channels are tuned, are compared to the aforementioned program record. This program record is compiled from information supplied by the sources of these programs, and is intended to reflect the identity of the programs which are supposed to be aired at the times indicated in the program records. Systems which read the ancillary codes of these programs are used to verify the accuracy of the program records, i.e. that the programs were actually aired at the intended times as indicated in the program records.

An example of such a system is disclosed in U.S. Pat. No. 4,025,851, which is assigned to the same assignee as the current application. The system disclosed therein monitors those programs which have a code written on a video line of one or more of a video program's vertical blanking intervals. The system described in this patent, which is generally referred to as the Automated Monitoring of Line-up (AMOL) system, has been in general use in the United States for over a decade, and is used to determine (i) the identity of aired programs, (ii) the local stations which air these programs, and (iii) the times during which these programs are aired. A system of this type significantly reduces the complexity, and improves the accuracy, of the resulting program records that are an essential element of current national television audience measurements. The AMOL system is not used within a sampled household due to code loss problems that can be more successfully remedied at a broadcast monitoring site, but that are intractable in a sampled household.

A system for radio audience monitoring is disclosed by Weinblatt in U.S. Pat. No. 4,718,106. Weinblatt teaches an audience measurement system in which each participant wears a metering device that includes a microphone and a detection circuit which responds to in-band codes in the programming. Weinblatt discusses background noise as a problem in this method, and teaches that such noise is avoidable by using a microphone having a low sensitivity. The system disclosed in U.S. Pat. No. 4,807,031 utilizes a robust video luminance coding method with a low data rate. The system disclosed in U.S. Pat. No. 4,945,412 utilizes a sub-audible 40 Hz tone to encode the audio portion of a broadcast.

In U.S. patent application Ser. No. 07/981,199, abandoned in favor of U.S. patent application Ser. No. 08/279,271, which was allowed Jan. 19, 1995 which is assigned to the same assignee as the current application, Thomas et al teach a multi-level encoding system in which a code may be inserted into a program at each level of distribution of the program. Each code identifies the source in its corresponding level of the multi-level encoding system. Thus, the program may be tracked through the distribution system.

The foregoing systems, which rely upon encoded broadcasts, require that all programs be encoded by at least one of the sources (e.g., broadcasters) in the distribution system. Even in the unlikely event that all broadcasters were to agree to cooperate, occasional encoding equipment failures would likely cause gaps in the data provided by systems that rely solely on codes. These gaps would cause losses of rating data and would render all of the program share measurements meaningless whenever any significant number of programs are not encoded. Thus, there is a need to collect program identifying data even when there is no code present in the programs to be identified.

Several broadcast measurement systems have been suggested which do not detect embedded codes in order to identify programs, but which instead monitor program content. These systems generally receive programs to be monitored at a measurement site, extract broadcast signatures from the programs, and compare these broadcast signatures with corresponding reference signatures previously extracted from reference copies of these programs (e.g., distribution tapes) or from previous broadcasts of the programs to be monitored. For example, in U.S. Pat. No. 4,697,209, which is assigned to the same assignee as the current application, a program monitoring system is disclosed in which broadcast signatures are collected in sampled households relative to certain program content (e.g., a scene change in the video portion of a monitored program). These broadcast signatures are subsequently compared to reference signatures collected by reference equipment tuned to broadcast sources available in the selected market. A favorable comparison between broadcast signatures and corresponding references signatures indicates the programs, not just the channel, being viewed.

A program monitoring system disclosed in U.S. Pat. No. 4,677,466, which is assigned to the same assignee as the current application, logs the broadcasts of selected programs (e.g., commercial advertisements). This monitoring system makes video tape recordings of unrecognized, suspected commercials (e.g., programs existing for short intervals which typically begin and end with a blank frame interval and which have lengths generally commensurate with the typical lengths of commercials) for subsequent viewing so that manual identifications of the unrecognized, suspected commercials may be made by a human operator. In order to manually identify those unrecognized, suspected commercials on the video tape recordings, such recordings must be transmitted to the human operator. As the unrecognized, suspected commercials are manually identified, they are given a program ID as appropriate.

Systems which rely upon the extraction of signatures in order to identify programs, however, also have well known shortcomings. Such systems are computationally expensive, and their use has been restricted by the cost of computer hardware. Additionally, such systems rely on reference measurement sites that collect reference signatures from known program sources. When one set of reference equipment fails, all reference signature data for that program source may be lost. If the lost data accounts for a significant fraction of tuning activity, the widely used statistic normally referred to as "share" becomes correspondingly unreliable.

It is also known to transmit (e.g., over a telephone connection) digitally compressed video and/or audio replicas of programs instead of program tapes. For example, in U.S. Pat. No. 4,888,638, which is assigned to the same assignee as the current application, programs are compressed and are sent over telephone lines to households. The compressed programs are stored in equipment in the households, and are subsequently displayed on television receivers as substitutes for regularly scheduled programs when certain preselected conditions are met (such as in response to program IDs contained in the compressed programs). A more recent teaching relating to the use of compressed video and/or audio replicas is disclosed by Strubbe in U.S. Pat. No. 5,223,924. Strubbe's system permits a television viewer to select programs for future viewing or recording based on the viewer's exposure to facsimiles of the program material generated from the compressed replicas stored in a database in the viewer's home.

SUMMARY OF THE INVENTION

Unlike these prior measurement systems, the system of the present invention collects data representative of selected programs rather than of tuned channels, and generally includes (i) a stationary and/or a portable household metering apparatus in a sampled household which operates during any time period when a broadcast is received, and which records ancillary codes that may be present in programs to be monitored and/or extracts program signatures from programs if no ancillary codes are found therein, (ii) a reference apparatus which monitors broadcast programs to be monitored, which extracts reference signatures therefrom, which stores these reference signatures, which records whatever ancillary codes may be associated with these broadcast programs to be monitored and, if no codes are present, which compresses and stores a digital replica representative of the broadcast programs to be monitored, (iii) a data collection apparatus which collects data from a plurality of such household metering apparatus and from one or more reference apparatus, and which compares the household and reference data to determine (a) which of the broadcast programs to be monitored were selected for viewing and/or listening, (b) which of the metered households viewed and/or listened to the broadcast programs to be monitored, and (c) at which times the broadcast programs to be monitored were selected for viewing and/or listening, and (iv) a central office apparatus which automatically determines a program name for each monitored encoded program, and which regenerates a facsimile of each monitored compressed broadcast program to permit a central office worker to view each regenerated facsimile and to provide each corresponding program with a program name.

The audience measurement system according to the present invention uses ancillary codes to identify encoded broadcast programs being selected for viewing and/or listening, and collects program data or signals (e.g., signatures) that can subsequently be used to identify non-encoded broadcast programs. The audience measurement system of the present invention can be non-intrusively installed in a statistically selected household so that physical intrusion into the entertainment equipment of the household is not required.

Accordingly, in one aspect of the invention, an audience measurement system identifies a program which is broadcast from a signal source and to which a household receiver in a household is tuned. The audience measurement system includes a reference receiver for receiving a broadcast of the program at a reference site. A program signature extractor is operably coupled to the household receiver to extract and store a program signature from the program. A reference signature extractor is coupled to the reference receiver to extract and store a reference signature from the program. The reference signature is compared the program signature to create a program-identifying viewing and/or listening record corresponding to the program. A household code reader is operably coupled to the household receiver, reads an ancillary code of the program received in the household, and stores the ancillary code of the program received in the household in a first memory. A reference code reader is coupled to the reference receiver, reads the ancillary code of the program received in the reference site, and stores the ancillary code of the program received in the reference site in a second memory. The ancillary codes are retrieved from the first and second memories. The ancillary codes retrieved from the first memory is compared to data stored in a code-program name library to thereby create a program-identifying viewing and/or listening record corresponding to the program. The ancillary code retrieved from the second memory is compared to the data stored in the code-program name library to thereby create a program-identifying broadcast record corresponding to the program.

In another aspect of the invention, an audience measurement system identifies a program which is broadcast from a signal source and to which a household receiver in a household is tuned. The audience measurement system includes a reference receiver for receiving a broadcast of the program at a reference site. A household code reader is operably coupled to the household receiver, reads an ancillary code of the program received in the household, and stores the ancillary code of the program received in the household in a first memory. The ancillary code in compared to data stored in a code-program name library to identify the program received in the household. A program signature extractor is operably coupled to the household receiver and extracts a program signature from the program. A reference signature extractor is coupled to the reference receiver and extracts a reference signature from the program. The program signature is compared to the reference signature to identify the program received in the household.

In still another aspect of the invention, an audience measurement apparatus collects data representative of program signals from a broadcast signal source. The program signals are received by a household receiver associated with a predetermined audience member. A first portion of the program signals carries an ancillary code and a second portion of the program signals is free of an ancillary code. The audience measurement apparatus includes a sensor operably associated with the household receiver for sensing first and second signal components of the corresponding first or second portions of the program signals received by the household receiver. A signal processor has an output, and processes the first and second signal components. A code reader is connected to the output of the signal processor, reads the ancillary code carried by the first portion of the program signals, and stores the ancillary code in a tuning data memory. A program signature generator is connected to the output of the signal processor, generates a program signature from the second portion of the program signals, and stores the program signature in the tuning data memory. The ancillary code and the program signature stored in the tuning data memory are communicated to a central office computer.

In a further aspect of the invention, an audience measurement system measures an audience of programs broadcast from a broadcast signal source wherein ones of the programs are received by a household receiver in a household and are selected for viewing and/or listening by a predetermined audience member of the audience. A first program element of the programs carry an ancillary code and a second program element of the programs is free of an ancillary code. The audience measurement system includes a program signature extractor in the household for extracting a program signature from at least one of the programs. A reference signature extractor in a reference site extracts a reference signature from at least one of the programs. The program signature is compared to the reference signature. A replica generator in the reference site generates and stores in a memory a compressed replica of the second program element. A facsimile of the second program element is regenerated from the compressed replica thereof so that an operator can identify a broadcast program associated with the second program element.

In yet a further aspect of the invention, a method of identifying ones of a plurality of broadcast programs received by a receiver associated with a member of a broadcast audience includes the following steps: a) detecting, at the receiver, a signal corresponding to one of the programs; b) if an ancillary identification code is present in the signal, reading and storing the ancillary identification code and a time interval during which the ancillary identification code is read as a time-stamped code datum in a first memory; c) if an ancillary identification code is not present in the signal, extracting a program signature from the signal and storing the program signature and a time at which the program signature is extracted as a time-stamped program signature datum in the first memory; d) forwarding the data in the first memory to a central office; e) detecting the signal at a local monitoring site; f) extracting a reference signature from the signal at the local monitoring site and storing the reference signature and a time at which the reference signature was extracted as a time-stamped reference signature datum in a second memory; g) storing in the second memory with the time-stamped reference signature datum either 1) an ancillary identification code read from the signal at the local monitoring site, or 2) a compressed digital replica of the signal; h) forwarding the data in the second memory to the central office; i) comparing, in the central office, the time-stamped code datum with a first library to thereby identify a first portion of the plurality of programs, the first library containing a list of broadcast program names and ancillary codes associated therewith; j) comparing, in the central office, the ancillary code stored with the time-stamped reference signature datum with the first library and with the time-stamped program signature datum to thereby identify a second portion of the plurality of programs; k) generating and manually identifying a facsimile of the compressed digital replica to thereby create a record in a second library, the second library containing a list of broadcast program names and signatures associated therewith; l) comparing the second library with the time-stamped program signature datum to thereby identify a third portion of the plurality of programs; and, m) repeating steps j), k), and l) until all time-stamped program signature data are either identified or determined to be unidentifiable.

In a still further aspect of the invention, an audience measurement system includes a receiver apparatus that is adjacent a sampled receiver which receives broadcast program signals. The receiver apparatus includes a first clock, a first telecommunication apparatus, a code reader for reading an ancillary code from an encoded portion of the broadcast program signals, a program signature generator for generating a program signature from a non-encoded portion of the broadcast program signals, and a first storing apparatus for storing first data including time-stamped code data relating to the ancillary code read by the code reader of the receiver apparatus and time-stamped signature data relating to the program signature generated by the program signature generator. A reference apparatus includes a reference receiver which receives the broadcast program signals from a monitored program source, a reference clock, a code reader for reading an ancillary code from the encoded portion of the broadcast program signals, a reference signature generator for generating a reference signature from the broadcast program signals, a compressed replica generator for generating a compressed replica of a non-encoded portion of the broadcast program signals, and second storing apparatus for storing second data comprising the ancillary code read by the code reader of the reference apparatus, the reference signature, and times at which the ancillary code was read by the code reader of the reference apparatus and at which the reference signature was generated. The second storing apparatus also stores third data comprising the compressed replica, and a time at which the compressed replica was generated. A comparison apparatus including a second telecommunication apparatus operably coupled to the first telecommunication apparatus, and third storing apparatus for also storing fourth data associating a predetermined program element with a predetermined ancillary code. The comparison apparatus receives the first, second, and third data of the first and second storing apparatus and makes a sequential comparison in which (i) the time-stamped code data are matched with the fourth data to thereby form a first subset of program-identified viewing and/or listening records, (ii) the program signatures are compared with the reference signatures, which has a program ID attached thereto, to thereby create a second subset of program-identified viewing and/or listening records and to thereby create an intermediate set of unidentified tuned-program signatures, (iii) ones of the intermediate set of unidentified program signatures are compared with the reference signatures of the third data to identify compressed replicas for each match that is found so that the broadcast signals corresponding to the identified compressed replicas can be regenerated therefrom, the regenerated broadcast signals being usable by a human operator to associate a program name with the unidentified program signatures, and to thereby generate a third subset of program-identified viewing and/or listening records, and leaving a final set of unidentified program signatures.

In a yet further aspect of the invention, an audience measurement system for identifying a program or station from a program signal which is received in a household by a household receiver includes a reference receiver for receiving a broadcast of the program signal at a reference site. A household code reader operably coupled to the household receiver reads an ancillary code, if present, from the program signal received in the household. The ancillary code is compared to data stored in a library to identify the program or station received in the household. A program signature extractor operably coupled to the household receiver extracts a program signature from the program signal if an ancillary code is not present in the program signal. A reference signature extractor coupled to the reference receiving means extracts a reference signature from the program signal broadcasted to the reference site. The program signature, if extracted, is compared to the reference signature to identify the program or station received in the household.

BRIEF DESCRIPTION OF THE DRAWING

These and other features and advantages will become more apparent from a detailed consideration of the invention when taken in conjunction with the drawing in which:

FIG. 4 is a tabular example of tuning records stored by the household metering apparatus of the television audience measurement system shown in FIGS. 2A–2F;

FIG. 6 is a tabular example of reference records stored by the reference apparatus of the television audience measurement system shown in FIGS. 2A–2F; and, FIG. 7 is a flow chart of the program recognition performed by a central office of the television audience measurement system shown in FIGS. 2A–2F.

DETAILED DESCRIPTION OF THE PREFERRED EMBODIMENT

Measurement System Overview

As shown in FIGS. 1 and 2A–2F, a television audience measurement system 10 measures the viewing habits of the members of a statistically selected household 12. The television audience measurement system 10 includes a household metering apparatus 14 located in the statistically selected household 12. The household metering apparatus 14 may include an audience composition determination device 16, which is referred to hereinafter as a people meter.

Figure 1:
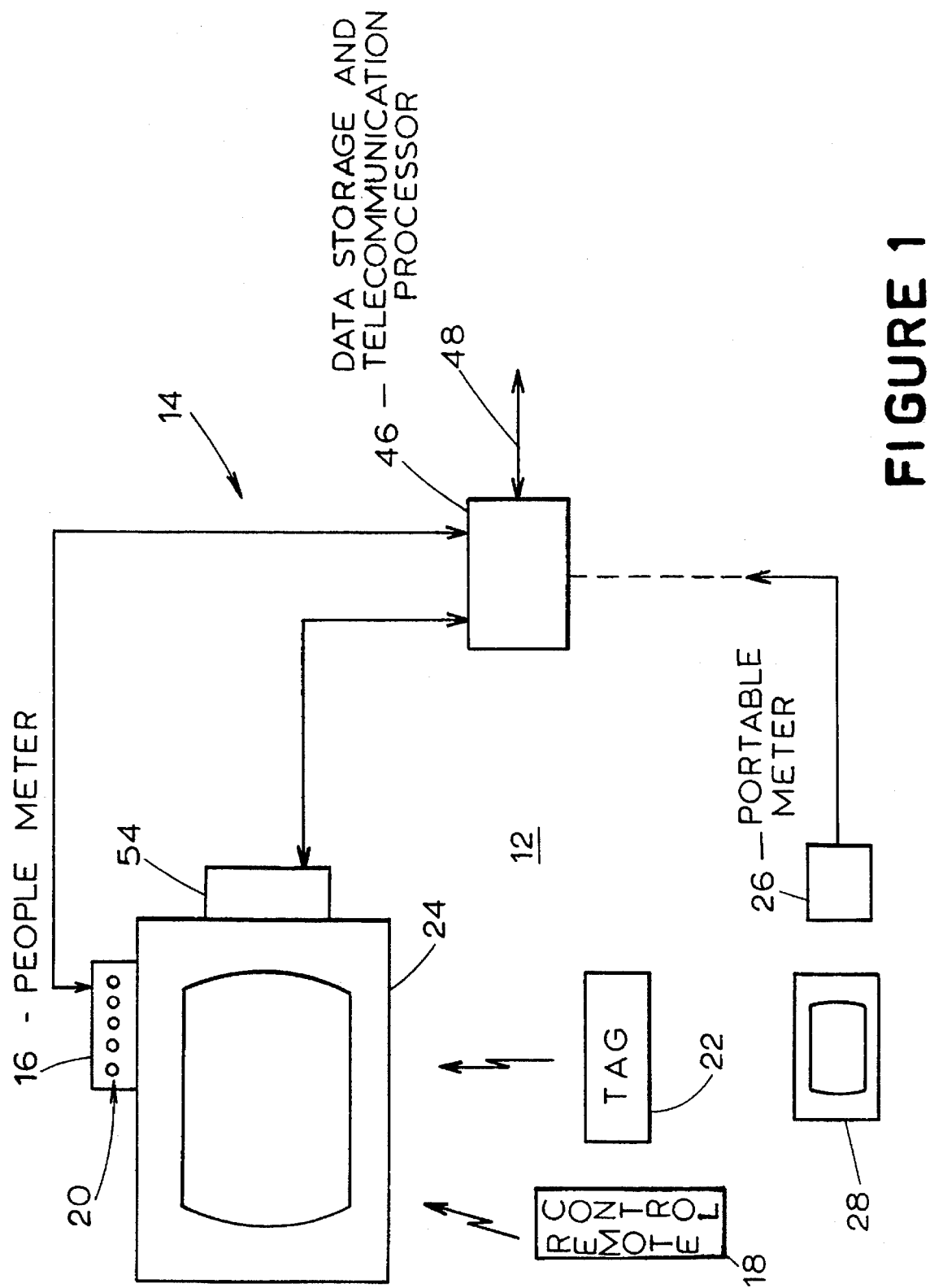
FIG. 1 is a schematic illustration of a household metering apparatus of a television audience measurement system according to the present invention.
Figure 2A:
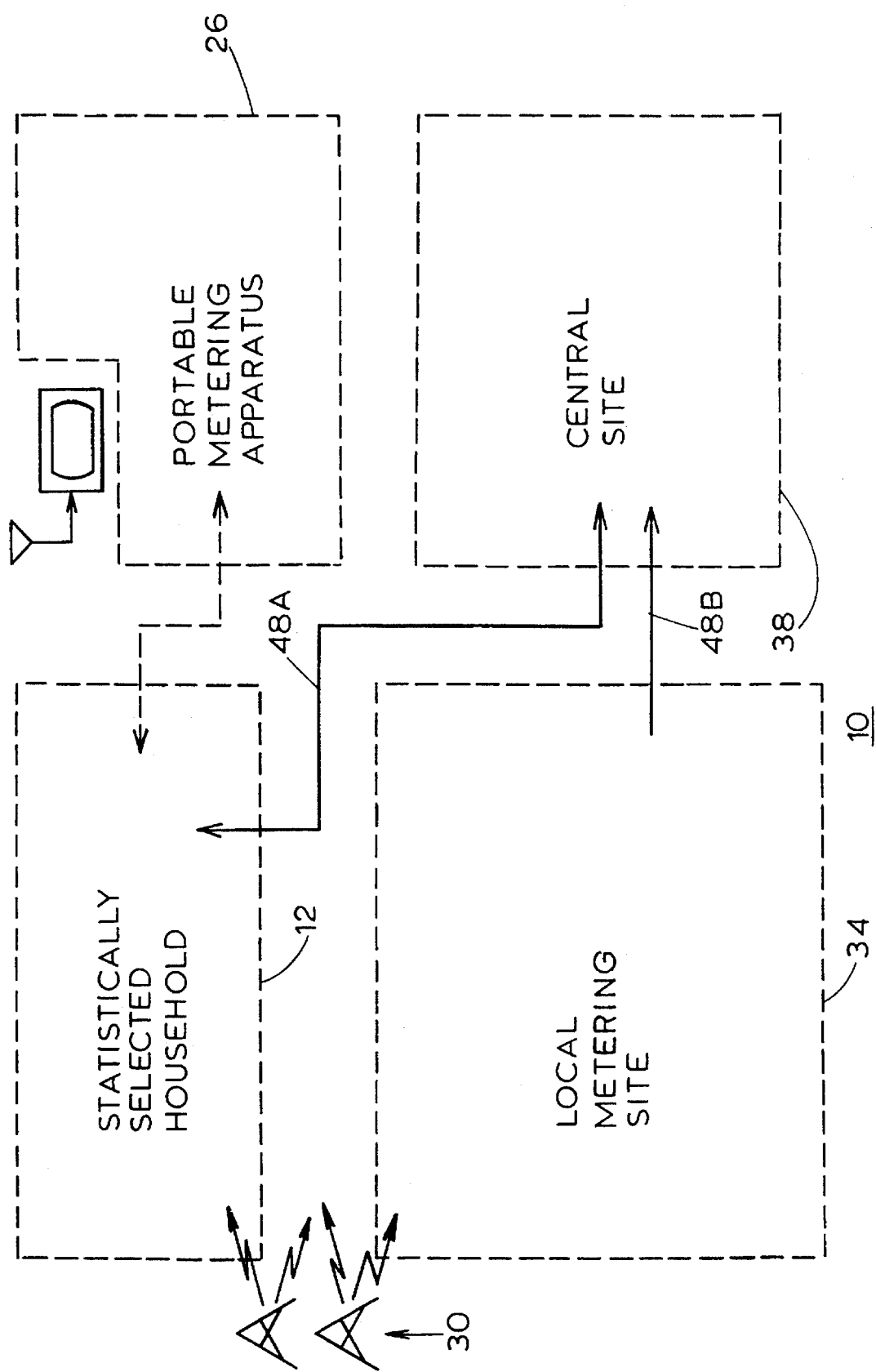
FIG. 2A is a diagram illustrating the interrelationship between FIGS. 2B–2E which show the components of a television audience measurement system according to the present invention.
Figure 2B:
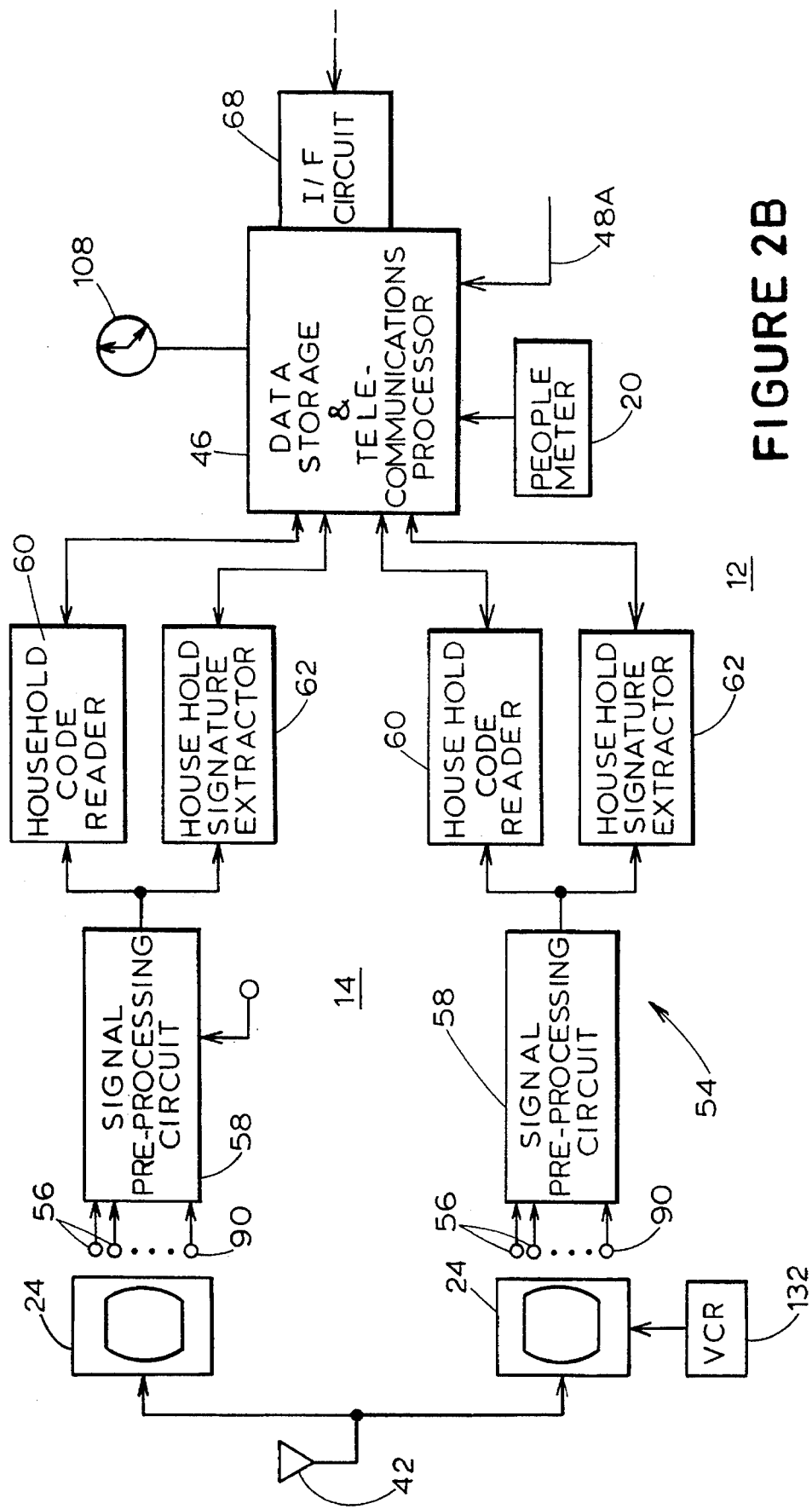
FIG. 2B illustrates in greater detail the statistically selected household of FIG. 2A.
Figure 2C:
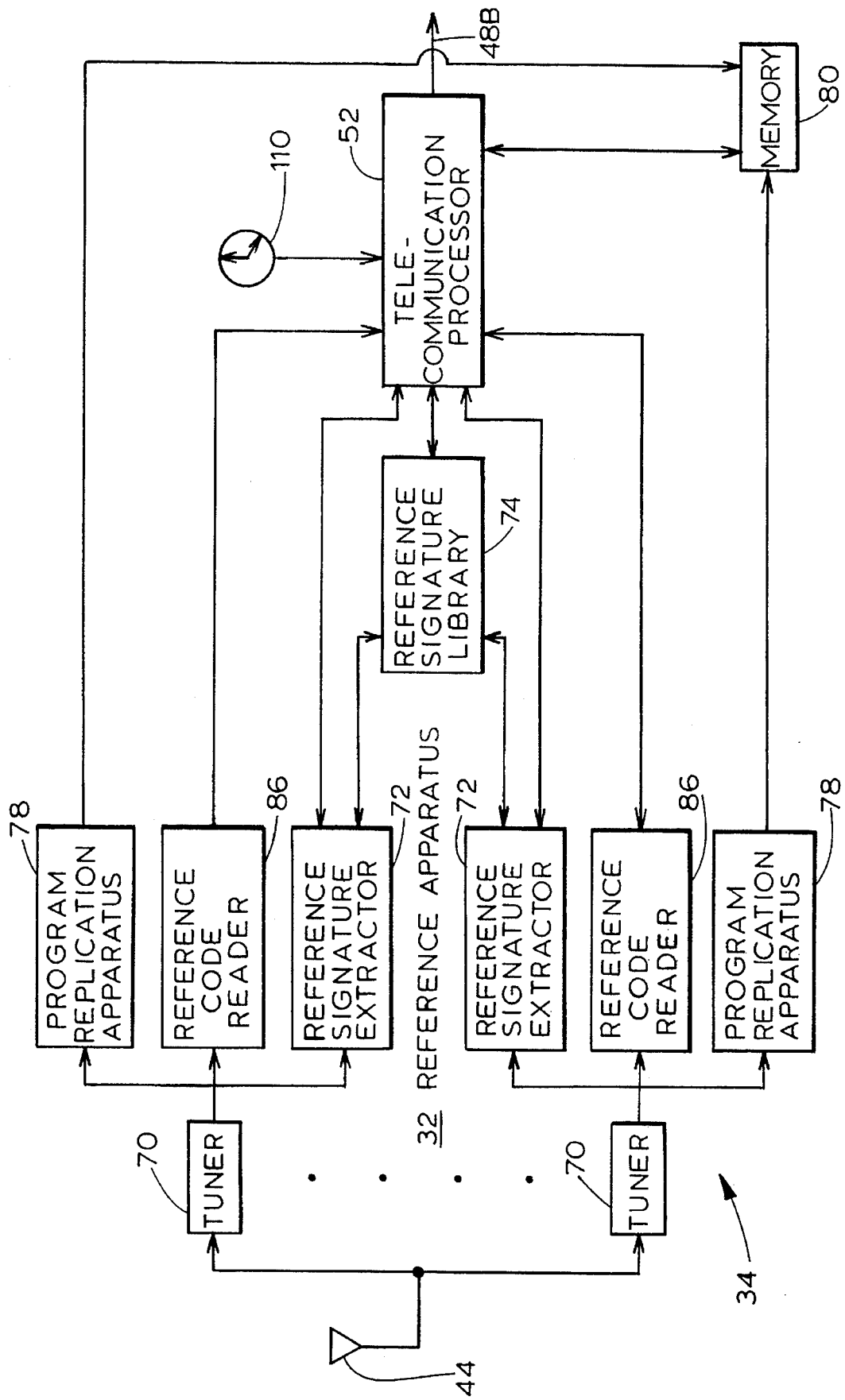
FIG. 2C illustrates in greater detail the local metering site of FIG. 2A.
Figure 2D:
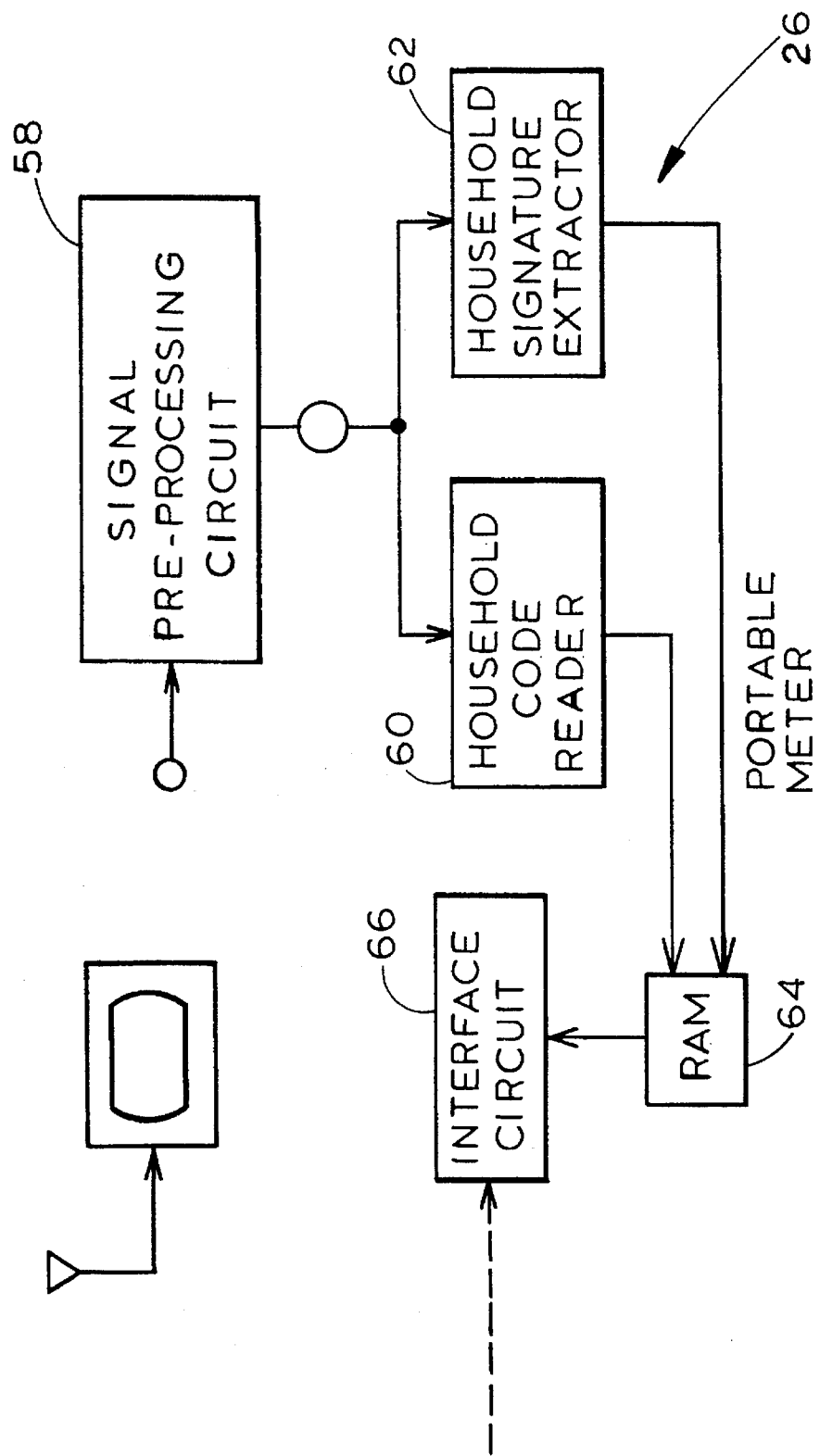
FIG. 2D illustrates in greater detail the portable metering apparatus of FIG. 2A.
Figure 2E:
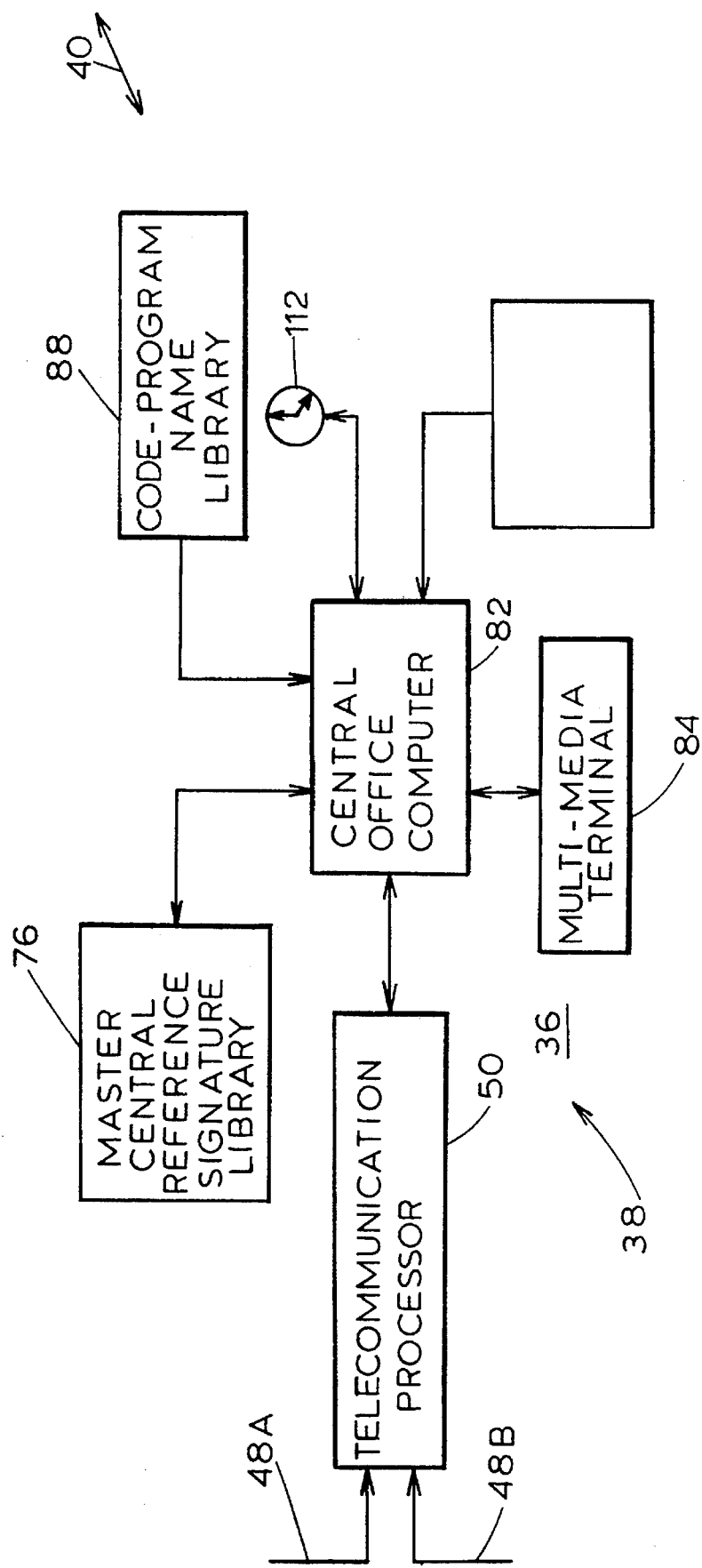
FIG. 2E illustrates in greater detail the central site of FIG. 2A.
Figure 2F:
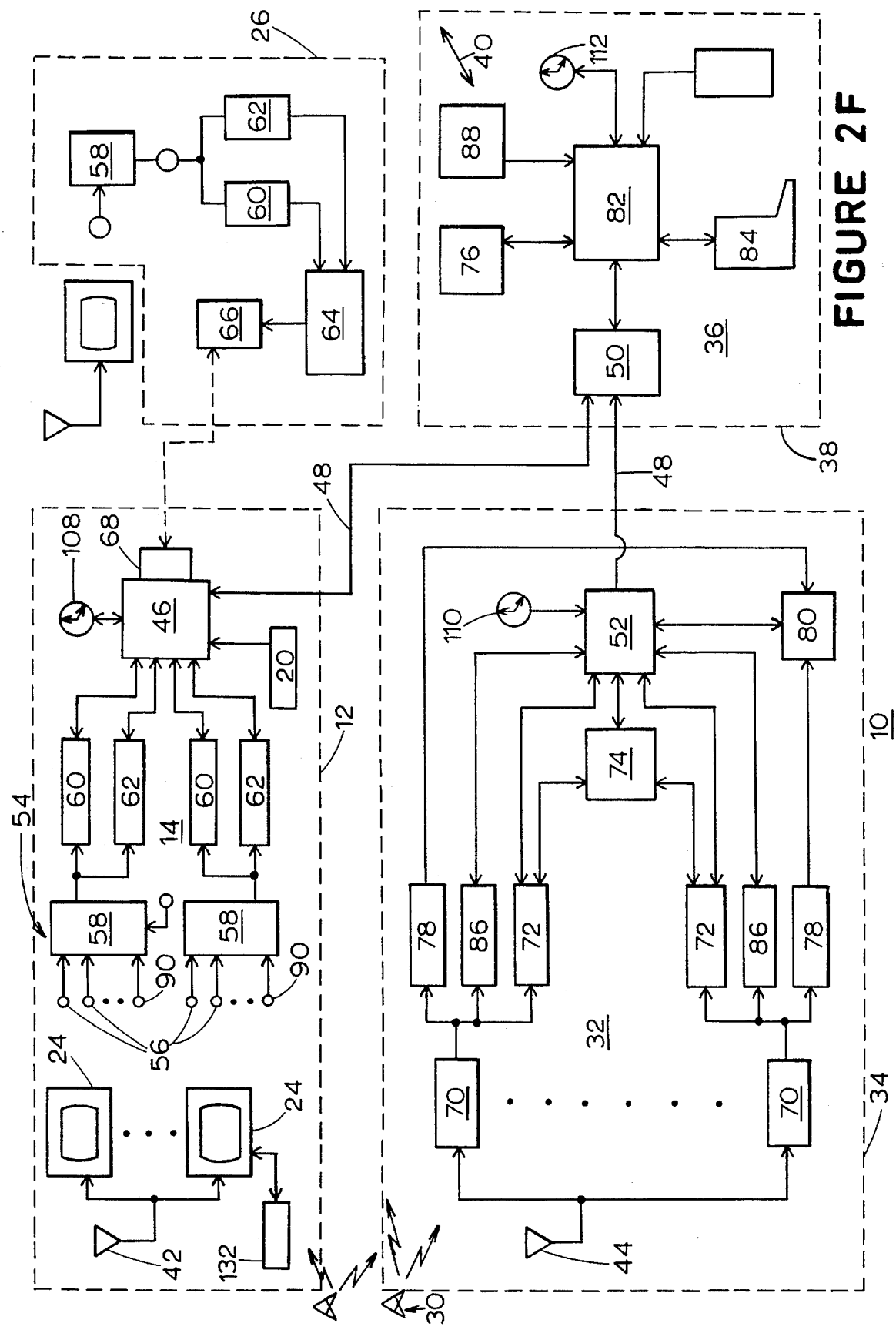
FIG. 2F is a composite illustration of the circuit details shown in FIGS. 2B– 2E.

The people meter 16 allows audience members to indicate their presence by means of a remote control 18 and/or a plurality of pushbutton switches 20. Alternatively, or additionally, a personal tag 22 may be worn by a viewer and may periodically broadcast an identifying message to the people meter 16. Each viewer in the household may have a personal tag 22 which emits an identifying message exclusively identifying the viewer. Instead of, or in addition to, responding to the remote control 18, the pushbutton switches 20, and/or the personal tag 22, the people meter 16 may include an infrared camera and a computer image processing system (not shown) in order to passively identify the viewers in a viewing audience without requiring the active participation of the viewers to be identified. U.S. Pat. Nos. 4,858,000, 5,031,228, and U. S. patent application Ser. No. 07/992,383 filed on Dec. 15, 1992 disclose examples of such a system. Accordingly, the people meter 16 identifies each viewing member of the viewing audience. It is desirable, but not essential, that the people meter 16 be located in the vicinity of a television to be metered. One such television 24 is shown in FIG. 1.

Although many audience measurements are restricted to a determination of viewing activity at the television 24 within the statistically selected household 12, it is clearly desirable to also measure viewing and tuning that may be done outside of the statistically selected household 12. For this purpose, a portable metering apparatus 26 is provided. The portable metering apparatus 26 may be worn or carried by a viewer of the statistically selected household 12 when, for example, the viewer is away from the household, and may be referred to as a personal people meter. The portable metering apparatus 26 is capable of metering the programs or stations to which a television in the vicinity of the portable metering apparatus 26 is tuned. The portable metering apparatus 26 may also be used in conjunction with a portable television 28.

As shown in FIGS. 2A–2F, the television audience measurement system 10 generally includes the household metering apparatus 14, which is installed in each of a plurality of statistically selected households, such as the statistically selected household 12, and which receives signals from one or more program signal sources 30. The television audience measurement system 10 also includes a reference apparatus 32 which is installed at a local monitoring site 34. The reference apparatus 32, as will be described hereinafter, includes (i) apparatus for each source of programs or for each group of sources of programs received at the local monitoring site 34 and (ii) apparatus common to all sources of programs received at the local monitoring site 34. The local monitoring site 34 should preferably be geographically close enough to a number of statistically selected households to receive signals from the same program signal sources 30.

The television audience measurement system 10 further includes a central office apparatus 36 which is installed at a central site 38 and which collects data from the household metering apparatus 14, from the reference apparatus 32, and from external program records sources as indicated by an arrow 40. The central office apparatus 36 processes the data collected from the household metering apparatus 14, from the reference apparatus 32, and/or from the external program records sources to produce audience measurement reports.

Although FIGS. 2A–2F schematically depict the program signal sources 30 as being broadcast transmission antennas which transmit program signals that are received by an antenna 42 in the statistically selected household 12 and by an antenna 44 in the local monitoring site 34, it will be understood that program signals can be distributed by a wide variety of means such as by coaxial cables, fiber optic cables, satellites, rented video tapes, videodiscs, and/or the like. Moreover, although FIGS. 2A–2F show television program signals being distributed to a plurality of television receivers 24 in a statistically selected household 12, it will become clear in the following discussion that the present invention is equally applicable to radio signals or to any other video and/or audio sources, such as tape cassettes and the like.

The household metering apparatus 14 of the television audience measurement system 10 preferably includes a data storage and telecommunication processor 46 that communicates, via a public switched telephone network 48A, with a telecommunication processor 50 of the central office apparatus 36. The public switched telephone network 48B supports communication between the telecommunication processor 50 of the central office apparatus 36 and a monitoring site data storage and telecommunication processor 52 of the reference apparatus 32.

The household metering apparatus 14 also includes tuning measurement equipment 54 for each of the monitored televisions 24. Each tuning measurement equipment 54 includes one or more sensors 56, a signal pre-processing circuit 58, a household code reader 60, and a household signature extractor 62. Any of a variety of sensors may be used for the sensors 56. For example, the sensors 56 may be, inter alia, a physical connection to the video circuits of the metered television 24. The preferred sensor for the sensors 56, however, is a non-intrusive sensor such as a microphone. Microphones, which can be installed in the immediate vicinity of the metered television 24 so as to pick up the sounds emanating from its speakers, offer an installation which is non-intrusive. Because the installation is non-intrusive, the metered television 24 need not be opened up in order to electrically connect the sensors 56 thereto. Objections which might otherwise be raised are thereby avoided.

Since microphones used as the sensors 56 will also pick up other sounds in the area, a second microphone 90 may be installed so that it picks up relatively more of the background noise and relatively less of the sounds from the speakers of the metered television 24. The output from the second microphone 90 is used by the signal pre-processing circuit 58 to at least partially delete background noise by the well known expedient of matching the amplitudes of the signals from the microphones 56 and 90, and then subtracting the signal produced by one of the microphones 56 and 90 from the signal produced by the other of the microphones 56 and 90. Alternatively, the signal pre-processing circuit 58 may employ other audio signal processing methods to reduce background noise. For example, the signal pre-processing circuit 58 may employ input filters that can, for example, pass only those audio signals in a 300 Hz–3000 Hz passband in order to eliminate traffic noise and to remove artifacts introduced by the response characteristics of the household's appliances and equipment. Other examples of non-intrusive sensors which can be used for the sensors 56 include inductive audio pickups operatively associated with the audio output circuitry of the metered televisions 24, video cameras located near the screen of the metered television 24 to collect video images thereon, or photosensors located adjacent to the screen of the metered televisions 24 to measure overall changes in screen luminance as a function of time, or a combination of the above.

The sensors 56 are arranged to acquire at least portions of the program signals corresponding to the programs or stations that household members select for viewing on the televisions 24. These portions of the program signals acquired by the sensors 56 are pre-processed, as desired, by the pre-processing circuit 58. The signal pre-processing circuit 58 supplies pre-processed program signals both to the household code reader 60, which attempts to locate and read ancillary codes from the program signals corresponding to the programs or stations selected by one or more viewers in the statistically selected household 12, and to the household signature extractor 62, which generates program signatures from the program signals selected by the one or more viewers whenever the household code reader 60 fails to find an ancillary code.

The household code reader 60 may be of a type similar to that disclosed in U.S. Pat. No. 4,025,851 by Haselwood et al, the disclosure of which is incorporated herein by reference, or by Thomas et al. in U.S. patent application Ser. No. 07/981,199, abandoned in favor of U.S. patent application Ser. No. 08/279,271, which was allowed Jan. 19, 1995. An ancillary code, as is disclosed in U.S. Pat. No. 4,025,851, is inserted onto a video line of one or more vertical blanking intervals in the program video and is read by the disclosed apparatus. Although video encoding is more widely used as a means of tracking television broadcasts than is audio encoding, video encoding is less amenable to detection by non-intrusive sensors. Thus, if the sensor 56 is a microphone, the ancillary code must be placed in the audio and may be read by apparatus similar to the video code reading apparatus disclosed in U.S. Pat. No. 4,025,851 or by apparatus similar to the audio code reading apparatus disclosed in U.S. Pat. No. 4,718,106. It will be clear to those skilled in the art, however, that the same essential benefits are available if the video codes taught by Haselwood et al in U.S. Pat. No. 4,025,851, or by Thomas et al in U.S. patent application Ser. No. 07/981,199, abandoned in favor of U.S. patent application Ser. No. 08/279,271, which was allowed Jan. 19, 1995 are used.

The ancillary code may have any form as long as the program and/or station associated therewith is uniquely identified by the ancillary code. Also, as taught by Thomas et al in U.S. patent application Ser. No. 07/981,199, abandoned in favor of U.S. patent application Ser. No. 08/279,271, which was allowed Jan. 19, 1995 the ancillary code may comprise a plurality of segments each containing unique source information so that the information in each segment is representative of a selected one of a plurality of levels of distribution of the associated program.

Since an ancillary code can carry with it all the information necessary for identifying a broadcast transmission, and since code readers are well-known, an audience measurement system that uses encoded program transmission is economically very attractive. Moreover, code readers for reading ancillary codes can be provided with appropriate checking algorithms and the like so that the number of failures to accurately read the ancillary code (such as the multilevel code described by Thomas et al in U.S. patent application Ser. No. 07/981,199) abandoned in favor of U.S. patent application Ser. No. 08/279,271, which was allowed Jan. 19, 1995 can be made arbitrarily low.

The problem with a system that relies exclusively on ancillary codes, as noted earlier herein, is that not all programs or stations are provided with useable ancillary codes. Thus, it is advantageous to also include a signature extractor to extract signatures from the program signals. Such signatures may be used when ancillary codes are not included in the program being viewed. Accordingly, the household signature extractor 62 is also included in the household metering apparatus 14 in addition to the household code reader 60 so that signatures can be collected from the received program signals from which a code cannot be read. These signatures are unique to the program signals from which they are extracted and, thus, may be used to identify the programs or stations being viewed. The household signature extractor 62 may be of the type disclosed in U.S. Pat. No. 4,697,209 by Kiewit et al, the disclosure of which is incorporated herein by reference.

The data storage and telecommunication processor 46 selectively stores the ancillary codes that have been read by the household code reader 60 and/or the signatures extracted by the household signature extractor 62. It should be noted that in the event that a partially legible code is read by the household code reader 60, the data storage and telecommunication processor 46 may also store the code fragment (e.g., one field of a multi-level code) for use by the television audience measurement system 10.

If the portable metering apparatus 26, which may be similar to the household metering apparatus 14 and which may also have one or more sensors 56, is used in or out of a given statistically selected household 12, the data that it generates are temporarily stored in a random access memory 64 so that it may be occasionally transferred to the data storage and telecommunication processor 46 by way of an interface circuit 66, such as a first modem, in the portable metering apparatus 26, and a corresponding interface circuit 68, such as a second modem, associated with the data storage and telecommunication processor 46. As is known in the art, data may be transmitted between the interface circuits 66 and 68 by direct electrical connections, radio frequency transmissions, pulsed infrared signalling, or the like. The portable metering apparatus 26 also includes a signal preprocessing circuit 58, a code reader 60, and a signature extractor 62.

The reference apparatus 32 of the television audience measurement system 10 may be also similar to the corresponding apparatus disclosed in U.S. Pat. No. 4,697,209 by Kiewit et al. In accordance with U.S. Pat. No. 4,697,209, a corresponding tuner 70 of the reference apparatus 32 is tuned to each of the possible channels (i.e., program sources) that the televisions 24 in the statistically selected household 12 can receive. The reference apparatus 32 also includes a reference signature extracter 72 for each received channel. The reference signature extractor 72 operates similarly to the household signature extractor 62 in order to extract reference signatures that can be compared to the program signatures extracted by the household signature extractors 62 of the household metering apparatus 14. The reference signatures which are extracted by the reference signature extractor 72, together with data indicating the corresponding program source and the time of signature extraction, may be stored in a reference signature library 74 at the local monitoring site 34 or in a master central reference signature library 76 at the central site 38. The reference signatures may be given program IDs in accordance with U.S. Pat. No. 4,677,466. The disclosure of U.S. Pat. No. 4,677,466 is herein incorporated by reference.

The reference apparatus 32 of the present invention further includes a program replication apparatus 78 for each received channel. The program replication apparatus 78 creates a replica of the monitored program and stores that replica in a memory 80 so that the replica can be subsequently retrieved by a central office computer 82 of the central office apparatus 36. Thus, a human operator can view the program on a multi-media terminal 84 for the purpose of identifying non-encoded programs received at the local monitoring site 34. The multi-media terminal 84 may include a video display and a speaker. Although the program replication apparatus 78 and the memory 80 may be a VCR system as taught in U.S. Pat. No. 4,677,466, the program replication apparatus 78 is preferably a signal compression apparatus that creates a digital replica of the monitored program and that stores the digital replica in the memory 80, which may be a computer memory. Accordingly, instead of mailing a tape recording from the local monitoring site 34 to the central site 38, the digital replica stored in the memory 80 may be transmitted electronically by way of the public switched telephone network 48B so that the compressed data can be used to regenerate a facsimile of at least portions of non-encoded programs. A human operator can view the facsimile on the multi-media terminal 84 for the purpose of identifying the non-encoded programs.

A variety of compression methods known to the art may be used to generate digital replicas of the monitored programs or stations. Video signals may be compressed, for example, in accordance with the methods described by W. R. Zettler et al in a report entitled "Application of Compactly Supported Wavelets to Image Compression". Audio signals may be compressed in accordance with the methods described by J. P. Stautner in a paper presented at the 93rd Convention of the Audio Engineering Society (Oct. 1–4, 1992). However, any other suitable compression technique may alternatively be used.

The reference apparatus 32 may also incorporate a reference code reader 86 for each received channel. The reference code reader 86 reads the same ancillary code that is read by the household code reader 60 at the statistically selected household 12. The code read by the reference code reader 86 is subsequently compared to code and program data stored in a code-program name library 88 at the central site 38 in an effort to identify the programs broadcast by a given broadcast source at a given time. Alternatively, the code-program name library 88 could be resident at the local monitoring site 34.

Code reception at the local monitoring site 34 is generally more reliable than code reception at the statistically selected household 12 because, for example, while steps can be taken at the local monitoring site 34 to improve reception so that code can be read from a weak signal, the same steps cannot necessarily be taken to improve reception at the statistically selected household 12 without adversely affecting the viewing which is being monitored. In such cases, while the code cannot be read at the statistically selected household 12, it can be read at the local monitoring site 34 and can be used in conjunction with the signatures extracted at both the statistically selected household 12 and the local monitoring site 34 to more efficiently identify the viewed programs. Thus, because reference signatures extracted by the signature extractor 72 can be compared (i.e., correlated) to the program signatures extracted by the household signature extractors 62, and because signatures extracted by the signature extractor 72 can be related to specific encoded programs, these specific encoded programs can be identified without the necessity of a human operator manually viewing the encoded programs in order to identify the programs from which signatures are extracted by the reference signature extractor 72. Accordingly, only non-encoded programs from which reference signatures had not been previously extracted by the reference signature extractor 72 need be viewed in order to identify and verify those non-encoded programs.

The central site 38, which collects data over the public switched telephone network 48A and 48B from all of the statistically selected households 12 and from all of the local monitoring sites 34, is indicated in FIGS. 2A–2F as being at a single location. Although this centralized single location for the collection of data may be advantageous in connection with the compilation of a single national television audience measurement from the different broadcasts in different cities, it should be clear that the local monitoring site 34 and the central site 38 can alternatively be located together at a site in each of the market areas being monitored, or the local monitoring site 34 and the central site 38 can be partially located together and partially dispersed. When portions of the systems are dispersed at a number of different locations, it is common practice to composite partially processed data from each site at a single central office and to issue the reportable data from that central location.

In-Household Measurements

Figure 3:
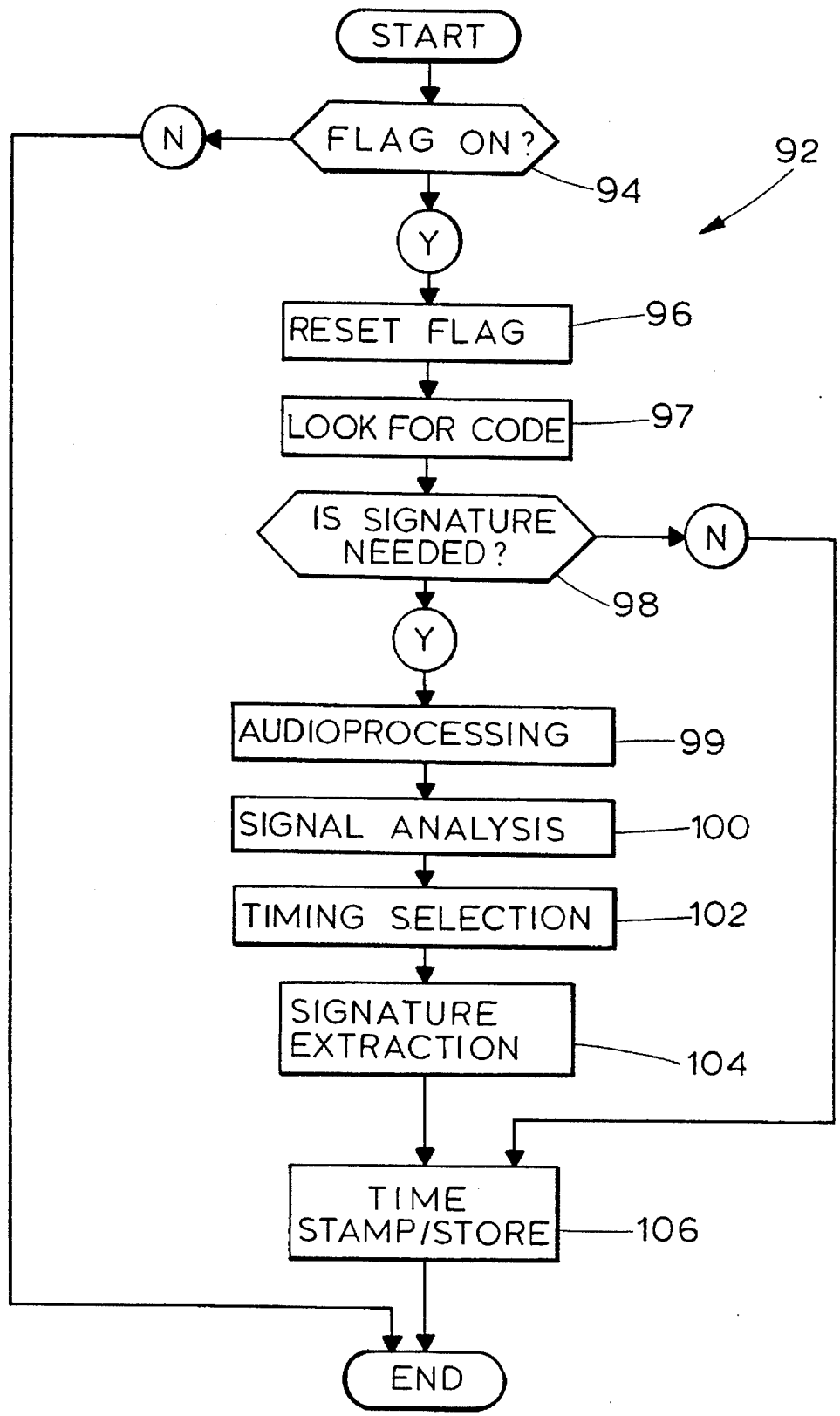
FIG. 3 is a flow chart of the operations performed by the household metering apparatus of the television audience measurement system shown in FIGS. 2A–2F.

The extraction of signatures by the household signature extractors 62 may be performed by a routine 92 shown in FIG. 3. This routine 92 may be performed by a processor in the data storage and telecommunication processor 46. At the beginning of the routine 92, a block 94 determines whether tuning data are needed. As discussed in U.S. Pat. No. 4,697,209, a logical flag may be set when either a television is turned on or the channel to which the television receiver is currently tuned is changed. As noted in U.S. Pat. No. 4,697,209, a loss of video synchronization may be used to set the flag to indicate a channel change if the television 24 is being metered by use of its video signal. On the other hand, if the television 24 is being metered by use of its audio signal (such as where a non-intrusive audio sensor is used), a sudden change in the audio may be used to set the flag to indicate a channel change. Alternatively, either the horizontal flyback 15 KHz "sound" or the average sound/picture level from the television 24 may be monitored to determine a change in the on/off status of the television 24. When the flag is set, the block 94 determines that it is time to record data. It should be noted that if no such flagging event occurs within some predetermined time-out period, and if the television 24 is on, the flag is set anyway in order to assure that a predetermined minimum number of signatures will be extracted during any given time period.

If the block 94 determines that the flag is not set, the routine 92 is ended and is reentered after a predetermined amount of time. This operation avoids unnecessary monitoring of televisions and/or radios which are off. If the block 94 determines that the flag is set, a block 96 resets the flag, and a block 97 reads an ancillary code in the signal received by the sensor 56, if such a code is present in this signal. A block 98 then determines whether it is necessary to extract signatures. For example, if an ancillary code is present in the signal received by the sensor 56, the program or station to which the television 24 (or, alternatively, a radio) is tuned is easily determined from the ancillary code and there is no need to additionally extract signatures. However, if an ancillary code is not present, the program or station to which the television 24 is tuned cannot be so simply determined, and therefore signatures must be extracted from the signal received by the sensors 56 so that the program or station can be identified therefrom. On the other hand, the block 98 may be arranged to cause signatures to be extracted from the program signal received by the sensors 56 regardless of whether there is an ancillary code in the program signal.

If the block 98 determines that signatures are to be extracted, a block 99 may, if desired, further process the signal from the signal pre-processing circuit 58 to further filter or eliminate noise in the signal supplied by the signal pre-processing circuit 58. The signal is then analyzed by a block 100 so that one of several timing methods may be selected by a block 102 in order to initiate the extraction of signatures by a signature extraction block 104. A block 106, by use of a clock such as a clock 108 at the statistically selected household 12 (FIGS. 2B–2E), either time stamps the ancillary code read by the block 97 or time stamps the signatures extracted by the block 104. The block 106 also stores the time stamped ancillary code and/or signature.

One of the timing methods which may be selected by the block 102 and which may be employed to initiate signature extraction by the block 104 includes the use of clock signals from the clock 108. According to this method, signatures are extracted by the household signature extractor 62 in response to a clock signal from the clock 108. This method involving the use of clock time is most appropriate in the measurement of real-time audiences, i.e. the measurement that, usually in the interest of economy, ignores time-shifted viewing of programs recorded in the home and time-independent viewing of rental tapes.

This clock signal method generally requires that the clock 108 at the statistically selected household 12 and the clock 110 at the local monitoring site 34 of the television audience measurement system 10 be synchronized to much less than the minimum reported viewing interval (which may be as short as one second, or as long as five minutes), and that the signatures extracted by the household signature extractor 62 at the statistically selected households 12 and by the reference signature extractor 72 at the local monitoring sites 34 be time-shiftable over about three to four times the expected synchronization error so that they can be effectively matched up. It has been common commercial practice for more than a decade to provide synchronization between clocks in an audience measurement system so as to maintain an accuracy of about one second at any instant during the day following synchronization. The expectation value of this one second drift error is limited by thermal considerations. It is well known that this one second variance can be reduced to about 0.1 second per day by controlling the temperatures of the various clocks 108, 110, and 112. Moreover, it is known that audio signatures can be structured so that they can be correlated with a temporal mismatch of about one second; thus, absolute timing is sometimes a useful approach.

Another of the timing methods which may be selected by the block 102 and which may be employed to initiate signature extraction by the block 104 depends upon the condition of the program signal from which the signatures are to be extracted. For example, as disclosed in U.S. Pat. No. 4,677,466, signatures may be extracted following a scene change from a portion of the program signal which is stable.

The block 104 may extract signatures using any of a variety of known signature extraction methods, such as any of the video and/or audio signature extraction methods taught in U.S. Pat. Nos. 4,697,209 and 4,677,466. The extracted signature, if desired, may be a number having one of several bytes (usually two bytes). If the measurement is relatively simple (e.g., the real-time-viewing-only case described hereinbefore), the system may be set up to use only a basic signature (e.g., the most significant signature byte, or the most significant signature byte subset in the case of a signature having more than two bytes). In other cases, where the number of viewing opportunities is greater, and the chance of an accidental match of two basic signatures is intolerably large, most or all of the signature bytes may be collected and used as an extended signature. In addition, in any case where non-real time viewing (e.g., viewing of rented video tapes or availability of a video-on-demand service) is encountered, the more comprehensive version of the signature may be collected.

The data available from the household metering apparatus 14 of the television audience measurement system 10 generally comprises a chronologically ordered set of tuning records 120 shown in FIG. 4, where a tuning record consists of a flag field 122, a type field 124 (e.g., to characterize the signature as having been extracted in response to different types of conditions, such as a scene change, absolute timing, a channel change, a television on/off change, and/or the like), a code field 126 and a program signature field 128 which together contain either a corresponding ancillary code or a corresponding program signature, and a time data field 130 containing the time at which (i) the corresponding ancillary code was detected, or (ii) the corresponding program signature was extracted, or (iii) the corresponding flag was set. The specific example shown in FIG. 4 could be generated by turning a television receiver on at a time H:M:0 and viewing an encoded program until time H:M+3:03, at which time a new program appeared on that channel and the viewer retuned (at time H:M+3:05) to a different channel carrying a program that did not have a legible ancillary code associated therewith.

The clock 110 is incorporated at the local monitoring site 34, in part, to temporally relate the data collected at the local monitoring site 34 to the data collected at the statistically selected household 12. For example, the time of signature extraction is associated with each extracted signature so that time intervals between sequentially extracted signatures can be calculated. As was taught in U.S. Pat. No. 4,697,209 by Kiewit et al, these time intervals between sequentially extracted signatures may be particularly important in the identification of non-real-time programs (e.g., those programs which are recorded in a statistically selected household 12 on a VCR 132, FIGS. 2A–2E, for subsequent viewing) since the current clock time associated with a time-shifted viewing event is of little value in the identification of the program being viewed. Thus, not only is the time interval between signatures useful to confirm that a correlation of two signatures is not accidental (because they were extracted at about the same time), as has been previously taught, but this time interval is useful as a search parameter in identifying non-real time viewing.

Collection of Reference Data

Figure 5:
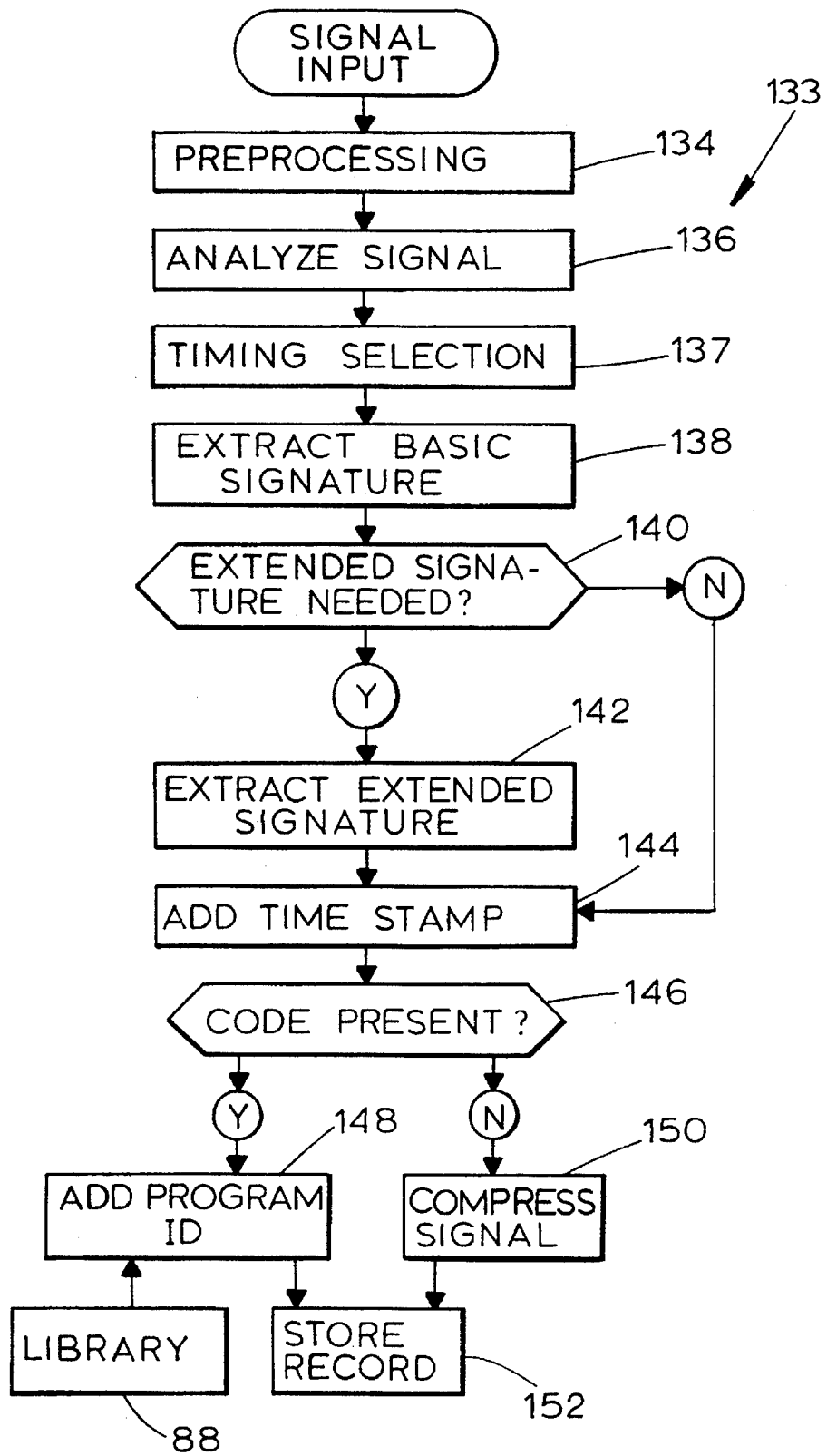
FIG. 5 is a flow chart of the operations performed by the reference apparatus of the television audience measurement system shown in FIGS. 2A–2F.

The extraction of signatures by the reference signature extractor 72 of the reference apparatus 32 is performed by a routine 133 shown in FIG. 5. This routine 133 may be performed by a processor in the monitoring site data storage and telecommunication processor 52. At the beginning of the routine 133, a block 134 preprocesses, as desired, the program signal from a corresponding tuner 70. As discussed above, the program signal from the tuner 70 is likely to be in a "cleaner" form than is a program signal which is processed in the statistically selected household 12. A block 136 then analyzes the processed signal in a manner similar to the block 100 (FIG. 3), and a block 137 determines a suitable timing approach for the extraction of signatures in a manner similar to the block 102 (FIG. 3).

Subsequently, a block 138 extracts a basic reference signature (i.e., the most significant signature byte or signature byte subset) based upon the timing method selected by the block 137. A block 140 determines if an extended reference signature (all signature bytes) is needed because, for example, a basic reference signature is so small for a particular application that erroneous results may result. If an extended reference signature is needed, a block 142 extracts the extended reference signature. Once the extended reference signature is extracted, or if an extended reference signature is not needed, a block 144 adds a time stamp to the reference signature. This time stamp is based upon the time indicated by the clock 110 of the reference apparatus 32.

A block 146 then determines if an ancillary code is associated with a program being aired on a channel selected by the tuner 70. If an ancillary code is detected, a block 148 determines the program ID of the tuned program based upon the detected ancillary code and the code-program information stored in the code-program library 88. That is, if the code-program library 88 is resident at the local monitoring site 34, the reference apparatus 32 determines the program ID; however, if the code-program library 88 is resident at the central site 38, the central office computer 82 determines the program ID. If an ancillary code is not detected by the block 146, a block 150 compresses at least a portion of the program signal. A block 152 stores the appropriate reference record as provided by the appropriate blocks 148 and 150.

Examples of two types of these reference records are shown in FIG. 6. These reference records are similar, at least in some respects, to the tuning records shown in FIG. 4. A first set of reference records 154 covers intervals when an ancillary code is detected in relation to a program passing through a tuner 70. The fields in these reference records of the first set of reference records 154 includes a time data field 156, a type field 158, a code field 160, an extracted reference signature field 162, and a replication data field 164. However, since an ancillary code was detected with respect to the reference records of the first set of reference records 154, there is no need to fill the replication data field 164 and, therefore, this field is blank.

A second set of reference records 166 covers intervals when an ancillary code is not detected in relation to a program passing through a tuner 70. The fields in the second set of reference records 166 includes a time data field 168, a type field 170, a code field 172, an extracted signature field 174, and a replication data field 176. However, since an ancillary code is not detected with respect to the reference records of the second set of reference records 166, there is no data in the code field 172; thus, there is a need to fill the replication data field 176. Accordingly, during such time intervals, the program replication apparatus 78 compresses the program signal passing through the corresponding tuner 70 and stores the resultant digital replica of the program signal in the memory 80.

No flag event detection of the sort used within a statistically selected household 12 is used in the reference apparatus 32. In a statistically selected household 12, it is necessary to collect data only while the television 24 is on. However, reference data collected in a local monitoring site 34 must serve to identify, at some later time, viewing from a plurality of such statistically selected households, and must therefore cover all instances during which a flag event could have occurred in any statistically selected household.

Central Office Operations

The central office apparatus 36 collects data from a plurality of local monitoring sites 34 and a plurality of statistically selected households 12. As will be apparent from the following discussion, the central office functions may be done at a single location as shown. However, for a small, simple system, the central office functions and the local monitoring site functions may be combined at a single site. Alternatively, for a large system (e.g., one that involves both local and national measurements), there may be a hierarchy of central offices in which some of the functions (e.g., identification of real time viewing) are done locally at each of a plurality of local central offices, while other functions (e.g., identification of viewing of rented video tapes) may be done at a single master central office.

Figure 7:
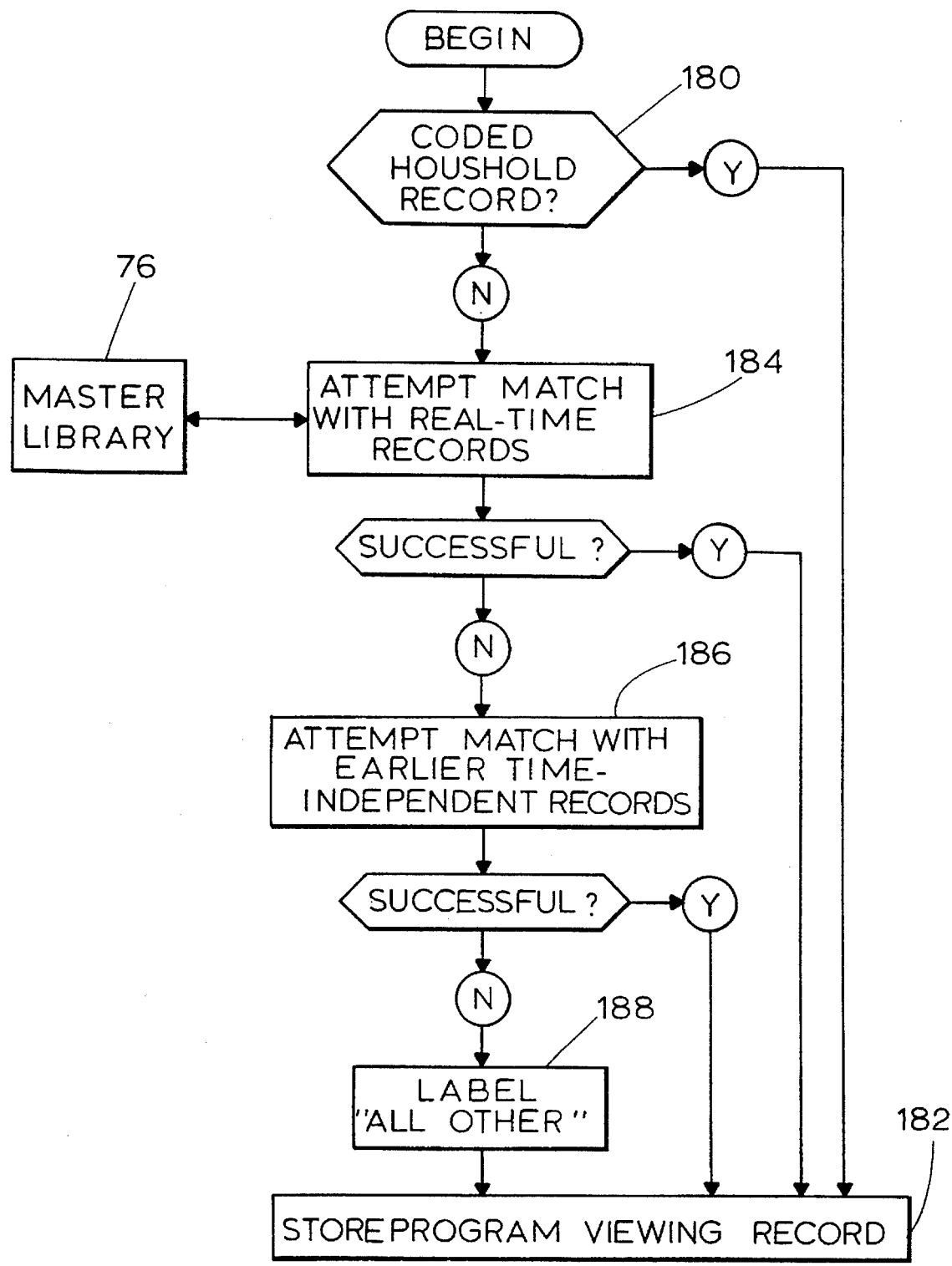

The major function of the central office apparatus 36 is that of identifying real time viewing. For this process, the central office apparatus 36 retrieves all of the reference records 154/166 from a plurality of local monitoring sites 34 and all of the tuning records 120 from the statistically selected households 12. These records are processed in accordance with the routine shown in FIG. 7.

A block 180 determines whether the tuning records 120 from the statistically selected households 12 include ancillary codes in the code field 126. For those tuning records 120 including an ancillary code, the associated programs IDs are obtained from the program-code library 88, and a block 182 stores the resulting corresponding program viewing records. These records indicate those programs which were watched at the indicated times. This process, however, serves to identify both real time viewing and non-real time viewing such as the playback of an in-home recording of an encoded broadcast program. A block 184 compares the balance of the tuning records 120 (i.e., those tuning records 120 containing no ancillary codes) to the reference records 154/166 retrieved from the local monitoring sites 34 and stored in the master central reference signature library 76. This comparison may be made in accordance with the teachings of U.S. Pat. No. 4,697,209.

As noted previously, some of the reference records (i.e., the reference records 154) stored in the master central reference signature library 76 include both signatures in the extracted signature field 162 and the associated ancillary codes in the code field 160. Other reference records (i.e., the reference records 154) include signatures and codes in which the ancillary codes were inferred by a previous comparison, made at the local monitoring site 34, between the reference signatures produced by the reference signature extractors 72 and reference signatures stored in the reference signature library 74. That is, the reference signature library 74 contains reference signatures which were previously extracted. These previously extracted reference signatures have program IDs associated therewith (e.g., an operator previously viewed the replicas of the programs corresponding to these previously extracted reference signatures and manually assigned program IDs to the previously extracted reference signatures). As the reference signature extractors 72 extract reference signatures, these reference signatures are compared to the previously extracted reference signatures stored in the reference signature library 74. If a reference signature just extracted matches a reference signature previously extracted, the program ID associated with the reference signature previously extracted may be assigned to the reference signature just extracted. Matches between time-stamped household tuning records 120 and corresponding time-stamped and code-labelled reference records 154 provide program-identified viewing records which are stored by the block 182.

Other real-time tuning records from the statistically selected households 12 may match the reference records 166 for which no ancillary codes are available. In these cases, the compressed replicas in the replication data field 176 are used to recreate enough of the corresponding programs (e.g., by regenerating video and displaying that video on the multimedia terminal 84) that an operator in the central office can view or hear the program to thereby manually identify the program.

It should be recognized in the foregoing discussion that the various matching processes can often be made more efficient by only matching reference records which are retrieved from a local monitoring site to tuning records which are retrieved from statistically selected households located in the same local market as the local monitoring site. It should also be recognized that various known sorting and "clustering" methods can be applied to the reference records from different local monitoring sites—e.g., if a non-encoded reference signature that was extracted at a first local monitoring site can be matched to a coded reference signature extracted from a different local monitoring site, then a manual identification step can be avoided. Alternatively, if a program replica is used to identify one broadcast of a non-encoded program, that identification can be automatically applied to other broadcasts of the same program at that or other local monitoring sites. Thus, clustering minimizes the size of the master central reference signature library and reduces the labor required for manual program identification. These sorting and clustering methods are taught, inter alia, in U.S. Pat. No. 4,677,466.

If the block 184 cannot match tuning records to reference records based, at least in part, upon ancillary codes, a block 186 correlates (i.e., matches) the program signatures contained in these tuning records to the reference signatures contained in the reference records which are stored in the master central reference signature library 76 and which were earlier generated, or to reference signatures of the reference records which are stored in the master central reference signature library 76 and which are time-independent master signatures (e.g., reference signatures characterizing a movie that is available as a rental video tape). A variety of known matching methods (e.g., the time-interval signature method taught in U.S. Pat. No. 4,697,209) may be used for performing these correlations. Tuning records which are not identified by the block 186 are labelled as "other" (i.e., as unidentified program viewing records) and are stored by the block 182.

Although the present invention has been described with respect to several preferred embodiments, many modifications and alterations have been described and still other modifications and alterations can be made without departing from the scope of the present invention. For example, the present invention can be used to identify either the programs or the stations being viewed or listened to by an audience. Therefore, as used herein, the term "programs", in addition to meaning segments of various lengths such as all or parts of programs, commercials, promos, public service announcements, and the like, can also mean stations being viewed or listened to by an audience. Also, although the manually operated devices 20 on the people meter 16 which allow audience members to indicate their presence have been described as a plurality of pushbutton switches 20, it should be appreciated that the these manually operated devices could be levers, knobs, or the like. Furthermore, although FIG. 1 shows the household metering apparatus 14 being located in the vicinity of the television 24, it should be appreciated that the sensors 56 may be located near the television 24 but that the household metering apparatus 14 may be located remotely from the television 24.

What is desired to be secured by Letters Patent is:
We claim:

1. An audience measurement system for identifying a program which is broadcast from a signal source and to which a household receiver in a household is tuned, the audience measurement system comprising:

reference receiving means for receiving a broadcast of the program at a reference site;

program signature extracting means operably coupled to the household receiver for extracting a program signature from the program;

reference signature extracting means coupled to the reference receiving means for extracting a reference signature from the program;

signature comparing means for comparing the program signature to the reference signature to create a first program-identifying tuning record corresponding to the program;

household code reading means operably coupled to the household receiver for reading an ancillary code of the program received in the household;

reference code reading means coupled to the reference receiving means for reading the ancillary code of the program received in the reference site; and, code comparing means for comparing the ancillary code received in the household to data stored in a code-program name library to thereby create a second program-identifying tuning record corresponding to the program, and for comparing the ancillary code received in the reference site to the data stored in the code-program name library to thereby create a program-identifying broadcast record corresponding to the program.

2. The audience measurement system of claim 1 further comprising a people identifying means for identifying individual people in a monitored audience.

3. The audience measurement system of claim 2 wherein the people identifying means comprises means for passively identifying the individual people in the monitored audience.

4. The audience measurement system of claim 3 wherein the means for passively identifying the individual people comprises a personal people meter.

5. The audience measurement system of claim 1 further comprising:

replica generating means coupled to the reference receiving means for generating a compressed replica of at least a portion of the program received by the reference receiving means; and, means for regenerating a facsimile of the at least a portion of the program received by the reference receiving means from the compressed replica, whereby an operator can identify the program received by the reference receiving means.

6. The audience measurement system of claim 5 wherein the compressed replica comprises digitally compressed video data and wherein the means for regenerating a facsimile comprises a video display.

7. The audience measurement system of claim 5 wherein the compressed replica comprises digitally compressed audio data and wherein the means for regenerating a facsimile comprises a speaker.

8. The audience measurement system of claim 1 further comprising;
   a first clock coupled to the program signature extracting means;
   a second clock coupled to the reference signature extracting means; and,
   wherein the first and second clocks are synchronized to a common time source at least once each day, wherein the first and second clocks therefore have a synchronization, wherein the synchronization has a drift error, wherein the drift error has an expectation value, and wherein the signature comparing means time-shifts the program and reference signatures with respect to one another when comparing the program and reference signatures.

9. The audience measurement system of claim 1 wherein the signature comparing means time-shifts the program and reference signatures with respect to one another.

10. The audience measurement system of claim 1 comprising a plurality of pairs of the reference signature extracting means and the reference code reading means, wherein each pair of the plurality of pairs is located at one of a plurality of reference sites, and wherein each pair of the plurality of pairs communicates with the code comparing means.

11. An audience measurement system for identifying a program which is broadcast in a signal from a signal source and to which a household receiver in a household is tuned, the audience measurement system comprising:
   reference receiving means for receiving a broadcast of the program at a reference site;
   household code reading means operably coupled to the household receiver for reading an ancillary code of the program received in the household;
   code comparing means for comparing the ancillary code to data stored in a code-program name library to identify the program received in the household;
   program signature extracting means operably coupled to the household receiver for extracting a program signature from the program;
   reference signature extracting means coupled to the reference receiving means for extracting a reference signature from the program; and,
   signature comparing means for comparing the program signature to the reference signature to identify the program received in the household.

12. The audience measurement system of claim 11 wherein the ancillary code comprises a plurality of unique source information data selectively encoded in uniquely specified segments of the signal, each of the unique source information data being representative of a selected one of a plurality of levels of distribution of the signal.

13. The audience measurement system of claim 11 wherein the ancillary code is encoded in a video portion of the program.

14. The audience measurement system of claim 13 wherein the household code reading means is non-electrically connected to the household receiver.

15. The audience measurement system of claim 13 wherein the household code reading means comprises a photosensor.

16. The audience measurement system of claim 11 wherein the ancillary code is encoded on an audio portion of the program.

17. The audience measurement system of claim 16 wherein the household code reading means is non-physically connected to the household receiver.

18. The audience measurement system of claim 17 wherein the household code reading means comprises an audio sensor.

19. An audience measurement apparatus for collecting data representative of program signals from a broadcast signal source, the program signals received by a household receiver associated with a predetermined audience member, a first portion of the program signals carrying an ancillary code and a second portion of the program signals being free of the ancillary code, the audience measurement apparatus comprising:
   sensing means operably associated with the household receiver for sensing first and second signal components of the corresponding first or second portions of the program signals received by the household receiver;
   signal processing means for processing the first and second signal components, the signal processing means having an output;
   code reading means connected to the output of the signal processing means for reading the ancillary code carried by the first portion of the program signals and for storing the ancillary code in a tuning data memory;
   program signature generating means connected to the output of the signal processing means for generating a program signature from the second portion of the program signals and for storing the program signature in the tuning data memory; and,
   communicating means for communicating the ancillary code and the program signature stored in the tuning data memory to a central office computer.

20. The audience measurement apparatus of claim 19 wherein the household receiver is a portable receiver and wherein the audience measurement apparatus further comprises means operably connected to the communicating means and having an interface operably connectable to the tuning data memory for receiving and storing data transferred from the tuning data memory before the data is transferred to the central office computer.

21. The audience measurement apparatus of claim 19 further comprising audience member identifying means for identifying the predetermined audience member.

22. The audience measurement apparatus of claim 21 wherein the audience member identifying means comprises a manually operated device operable by the predetermined audience member.

23. The audience measurement apparatus of claim 21 wherein the audience member identifying means comprises a passive people meter.

24. The audience measurement apparatus of claim 19 wherein the ancillary code is encoded on an audio portion of the program signals.

25. The audience measurement apparatus of claim 24 wherein the code reading means is non-physically connected to the household receiver.

26. The audience measurement apparatus of claim 25 wherein the code reading means comprises an audio sensor.

27. The audience measurement apparatus of claim 25 wherein the code reading means comprises an optical sensor.

28. An audience measurement system for use in measuring an audience of programs broadcast from a broadcast signal source wherein ones of the programs are received by a household receiver in a household and are selected by a predetermined audience member of the audience for viewing or listening, wherein a first program element of the programs carry an ancillary code and a second program element of the programs is free of the ancillary code, the audience measurement system comprising:

program signature extracting means in the household for extracting a program signature from at least one of the programs;

reference signature extracting means in a reference site for extracting a reference signature from at least one of the programs;

comparing means operably coupled to the program signature extracting means and to the reference signature extracting means for comparing the program signature to the reference signature;

replica generating means in the reference site for generating and storing in a memory a compressed replica of the second program element; and, regenerating means operably coupled to the replica generating means for regenerating a facsimile of the second program element from the compressed replica thereof, whereby an operator can identify a broadcast program associated with the second program element.

29. The reference signature collection apparatus of claim 28 wherein the compressed replica comprises a digitally compressed video signal and wherein the regenerating means comprises a video display.

30. The reference signature collection apparatus of claim 28 wherein the compressed replica comprises a digitally compressed audio signal and wherein the regenerating means comprises a speaker.

31. A method of identifying ones of a plurality of broadcast programs received by a receiver associated with a member of a broadcast audience, the method comprising the steps of:

a) detecting, at the receiver, a signal corresponding to one of the programs;

b) if an ancillary identification code is present in the signal, reading and storing the ancillary identification code and a time interval during which the ancillary identification code is read as a time-stamped code datum in a first memory;

c) if the ancillary identification code is not present in the signal, extracting a program signature from the signal and storing the program signature and a time at which the program signature is extracted as a time-stamped program signature datum in the first memory;

d) forwarding the data in the first memory to a central office;

e) detecting the signal at a local monitoring site;

f) extracting a reference signature from the signal at the local monitoring site and storing the reference signature and a time at which the reference signature was extracted as a time-stamped reference signature datum in a second memory;

g) storing in the second memory with the time-stamped reference signature datum either 1) the ancillary identification code read from the signal at the local monitoring site, or 2) a compressed digital replica of the signal;

h) forwarding the data in the second memory to the central office;

i) comparing, in the central office, the time-stamped code datum with a first library to thereby identify a first portion of the plurality of programs, the first library containing a list of broadcast program names and ancillary codes associated therewith;

j) comparing, in the central office, the ancillary code stored with the time-stamped reference signature datum with the first library and with the time-stamped program signature datum to thereby identify a second portion of the plurality of programs;

k) generating and manually identifying a facsimile of the compressed digital replica to thereby create a record in a second library, the second library containing a list of broadcast program names and signatures associated therewith;

l) comparing the second library with the time-stamped program signature datum to thereby identify a third portion of the plurality of programs; and, m) repeating steps j), k), and l) until all time-stamped program signature data are either identified or determined to be unidentifiable.

32. The method of claim 31 wherein an identity of the audience member is associated with the time-stamped code datum and the time-stamped program signature datum.

33. An audience measurement system comprising:

a receiver apparatus adjacent a sampled receiver which receives broadcast program signals, the receiver apparatus including a first clock, a first telecommunication apparatus, code reading means for reading ancillary codes from encoded portions of the broadcast program signals, program signature generating means for generating program signatures from non-encoded portions of the broadcast program signals, and a first storing means for storing first data including time-stamped code data relating to the ancillary codes read by the code reading means of the receiver apparatus and time-stamped signature data relating to the program signatures generated by the program signature generating means;

reference apparatus including a reference receiver which receives the broadcast program signals from a monitored program source, a reference clock, code reading means for reading the ancillary codes from the encoded portions of the broadcast program signals, a reference signature generating means for generating reference signatures from the broadcast program signals, a compressed replica generating means for generating compressed replicas of the non-encoded portions of the broadcast program signals, and second storing means for storing second data comprising the ancillary codes read by the code reading means of the reference apparatus, the reference signatures, and times at which the ancillary codes were read by the code reading means of the reference apparatus and at which the reference signatures were generated, the second storing means storing third data comprising the compressed replicas, and a time at which the compressed replicas were generated; and, a comparison apparatus including a second telecommunication apparatus operably coupled to the first telecommunication apparatus, and third storing means for storing fourth data associating predetermined program elements with corresponding predetermined ancillary codes, the comparison apparatus receiving the first, second and third data of the first and second storing means and making a sequential comparison in which (i) the time-stamped code data are matched with the fourth data to thereby form a first subset of program-identified viewing records, (ii) the program signatures are compared with the reference signatures to thereby create a second subset of program-identified viewing records and to thereby create an intermediate set of unidentified tuned-program signatures, (iii) ones of the intermediate set of unidentified program signatures are compared with the reference signatures of the third data to identify compressed replicas for each match that is found so that the broadcast program signals corresponding to the identified compressed replicas can be regenerated therefrom, the regenerated broadcast program signals being usable by a human operator to associate a program name with the unidentified program signatures, and to thereby generate a third subset of program-identified viewing records and leaving a final set of unidentified program signatures.

34. An audience measurement system for identifying a program or station from a program signal which is received in a household by a household receiver, the audience measurement system comprising:

reference receiving means for receiving a broadcast of the program signal at a reference site;

household code reading means operably coupled to the household receiver for reading an ancillary code, if present, from the program signal received in the household;

code comparing means for comparing the ancillary code to data stored in a library to identify the program or station received in the household;

program signature extracting means operably coupled to the household receiver for extracting a program signature from the program signal if the ancillary code is not present in the program signal;

reference signature extracting means coupled to the reference receiving means for extracting a reference signature from the program signal broadcasted to the reference site; and, signature comparing means for comparing the program signature, if extracted, to the reference signature to identify the program or station received in the household.

35. The audience measurement system of claim 34 wherein the household code reading means is non-electrically connected to the household receiver.

36. The audience measurement system of claim 35 wherein the household code reading means comprises an audio sensor.

37. An audience measurement apparatus for collecting data representative of program signals from a broadcast signal source, the program signals received by a household receiver associated with a predetermined audience member, a first portion of the program signals carrying an ancillary code, and a second portion of the program signals being free of the ancillary code, the audience measurement apparatus comprising:

first means operably associated with the household receiver for sensing the first and second portions of the program signals received by the household receiver, the first means having an output;

the second means connected to the output of the first means for reading the ancillary code carried by the first portion of the program signals;

third means connected to the output of the first means for generating a program signature from the second portion of the program signatures; and, fourth means connected to the second and third means for storing the ancillary code and the program signature.

* * * * *

UNITED STATES PATENT AND TRADEMARK OFFICE
CERTIFICATE OF CORRECTION

PATENT NO.   :   5,481,294
DATED        :   January 2, 1996
INVENTOR(S)  :   WILLIAM L. THOMAS and DAOZHENG LU It is certified that error appears in the above-identified patent and that said Letters Patent is hereby corrected as shown below:

Column 3, line 16, after "1995", insert --and--;

Column 11, line 58, "multilevel" should be --multi-level--;

Column 12, line 46, "extracter" should be --extractor--;

Column 16, line 41, "2A-2E" should be --2B-2E--;

Signed and Sealed this

Thirtieth Day of July, 1996

Attest:

BRUCE LEHMAN

*Attesting Officer*        *Commissioner of Patents and Trademarks*